United States Patent
Kim et al.

(10) Patent No.: US 11,290,750 B2
(45) Date of Patent: Mar. 29, 2022

(54) DISPLAY APPARATUS AND METHOD OF CONTROLLING THE SAME

(71) Applicant: SAMSUNG ELECTRONICS CO., LTD., Suwon-si (KR)

(72) Inventors: Dong Yoon Kim, Suwon-si (KR); Seung-Ho Park, Suwon-si (KR); Tae Gyoung Ahn, Suwon-si (KR); Ho Cheon Wey, Suwon-si (KR); Sang Hun Kim, Suwon-si (KR); Young Su Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/641,131

(22) PCT Filed: Dec. 7, 2018

(86) PCT No.: PCT/KR2018/015540
§ 371 (c)(1),
(2) Date: Apr. 10, 2020

(87) PCT Pub. No.: WO2019/112376
PCT Pub. Date: Jun. 13, 2019

(65) Prior Publication Data
US 2020/0245000 A1 Jul. 30, 2020

(30) Foreign Application Priority Data

Dec. 8, 2017 (KR) .......................... 10-2017-0168084

(51) Int. Cl.
*H04N 19/895* (2014.01)
*H04N 5/232* (2006.01)
(Continued)

(52) U.S. Cl.
CPC ....... *H04N 19/895* (2014.11); *H04N 5/23229* (2013.01); *H04N 5/23293* (2013.01)

(58) Field of Classification Search
USPC .................................................. 386/353–358
See application file for complete search history.

(56) References Cited

U.S. PATENT DOCUMENTS 6,064,768 A * 5/2000 Hajj ..................... G06K 9/4609
382/190
7,865,035 B2 1/2011 Lin et al.
(Continued)

FOREIGN PATENT DOCUMENTS

JP  2000-050275 A  2/2000
JP  2000-350202 A  12/2000
(Continued)

OTHER PUBLICATIONS

International Search Report dated Apr. 2, 2019 issued by the International Searching Authority in counterpart International Application No. PCT/KR2018/015540 (PCT/ISA/210).
(Continued)

*Primary Examiner* — Hung Q Dang
(74) *Attorney, Agent, or Firm* — Sughrue Mion, PLLC

(57) ABSTRACT

A display apparatus and method that reduces block noise by performing block noise boundary detections and generating a block noise boundary map on the basis of a result of the detections to cope with local random block noise having irregular shaped and blurred block boundaries to perform adaptive deblocking filtering. The apparatus includes: an image receiver; a map generator to generate a block boundary map by performing convolution using a plurality of kernels on a received image; a determiner to determine a filter parameter on the basis of the block boundary map and a block boundary period included in the block boundary map; a deblocking filter to vary a filter strength on the basis
(Continued)

of the determined filter parameter; and a display on which an image in which block noise is removed by the deblocking filter is displayed.

10 Claims, 18 Drawing Sheets

(51) Int. Cl.
*H04N 19/172* (2014.01)
*H04N 19/117* (2014.01)
*H04N 19/14* (2014.01)
*H04N 19/176* (2014.01)
*H04N 19/86* (2014.01)

(56) References Cited

U.S. PATENT DOCUMENTS

| | | | |
|---|---|---|---|
| 7,911,538 B2 | 3/2011 | Ha et al. | |
| 8,175,405 B1* | 5/2012 | Pathak | H04N 19/117 382/254 |
| 2008/0240571 A1* | 10/2008 | Tian | H04N 19/436 382/190 |
| 2009/0245755 A1 | 10/2009 | Lee et al. | |
| 2010/0128168 A1 | 5/2010 | Zhen et al. | |
| 2010/0177983 A1 | 7/2010 | Hsu | |
| 2010/0202262 A1* | 8/2010 | Adams | H04N 19/865 369/47.15 |
| 2010/0246990 A1 | 9/2010 | Lertrattanapanich et al. | |
| 2011/0123121 A1* | 5/2011 | Springer | H04N 19/176 382/199 |
| 2011/0243466 A1* | 10/2011 | Lee | H04N 19/14 382/233 |
| 2012/0185570 A1* | 7/2012 | Bouazizi | H04N 21/44209 709/219 |
| 2014/0233649 A1* | 8/2014 | Cheng | H04N 19/82 375/240.16 |
| 2015/0030247 A1* | 1/2015 | Shu | G06T 5/005 382/167 |
| 2018/0131969 A1* | 5/2018 | Huang | H04N 19/137 |

FOREIGN PATENT DOCUMENTS

| | | |
|---|---|---|
| JP | 2003-070020 A | 3/2003 |
| JP | 2005-012641 A | 1/2005 |
| JP | 2012-517774 A | 8/2012 |
| KR | 10-0942700 B1 | 2/2010 |
| KR | 10-2011-0116055 A | 10/2011 |
| KR | 10-1112139 B1 | 3/2012 |
| KR | 10-1647376 B1 | 8/2016 |
| KR | 10-1649882 B1 | 8/2016 |
| KR | 10-2017-0097596 A | 8/2017 |

OTHER PUBLICATIONS

Communication dated Jun. 15, 2020 issued by the European Patent Office in European Application No. 18885945.8.
Lee, S., "Edge Statistics-based Image Scale Ratio and Noise Strength Estimation in DCT-coded Images", IEEE Transactions on Consumer Electronics, vol. 55, No. 4, Nov. 2009, pp. 2139-2144.
Communication dated Dec. 25, 2020, from the Japanese Patent Office in Japanese Application No. 2020-510530.
Communication dated Mar. 17, 2021 issued by the European Patent Office in European Application No. 18885945.8.
Communication dated Jun. 9, 2021, issued by the China National Intellectual Property Administration in Chinese Application No. 201880054667.6.
Communication dated Jul. 6, 2021, issued by the Korean Intellectual Property Office in Korean Application No. 10-2017-0168084.
Communication dated Sep. 16, 2021 issued by the Korean Intellectual Property Office in Korean Application No. 10-2017-0168084.

* cited by examiner

FIG. 6B
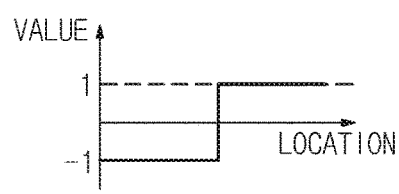
KERNEL 1
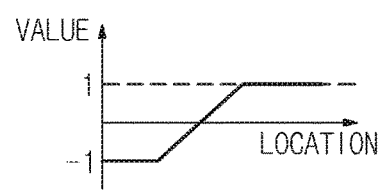
KERNEL 2
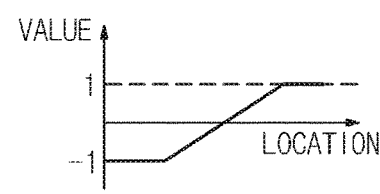
KERNEL 3

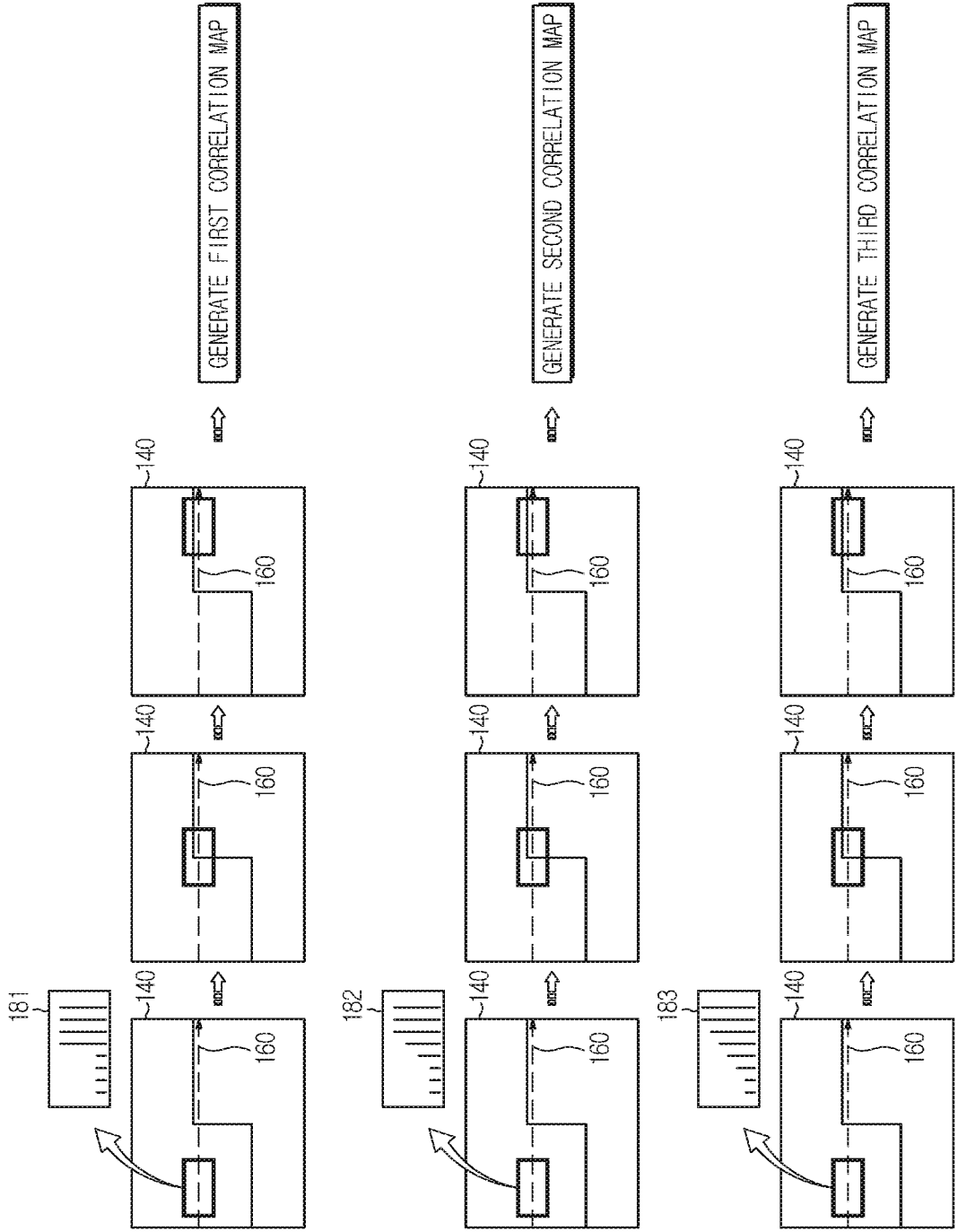

FIG. 8
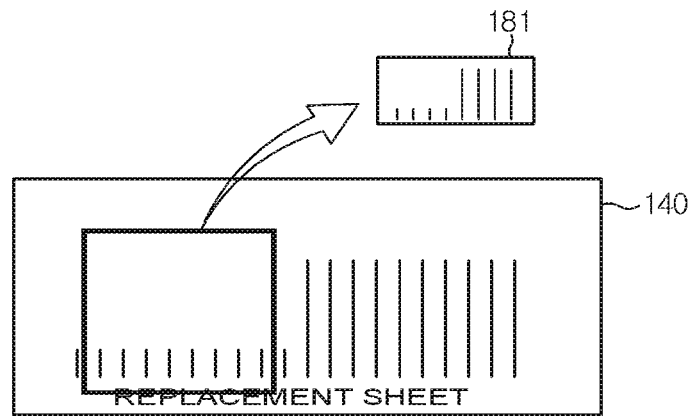
CORRELATION
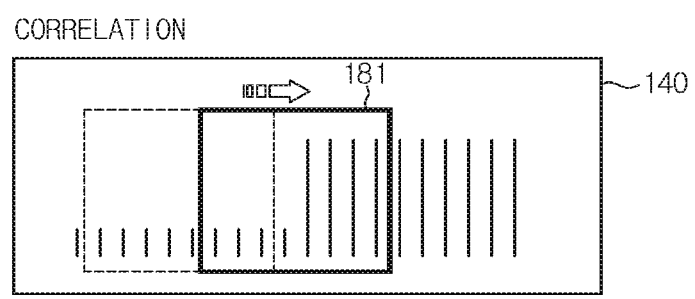
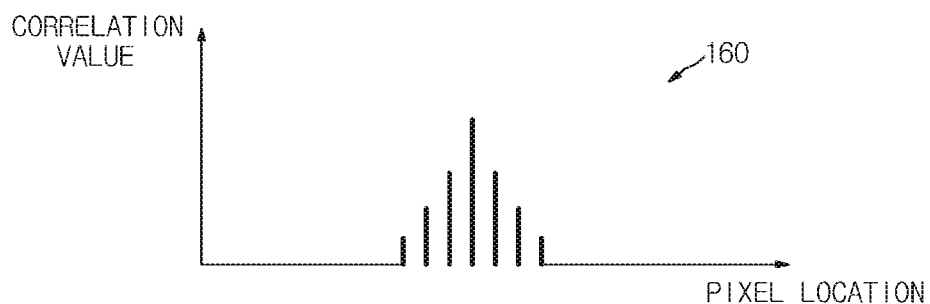

FIG. 13
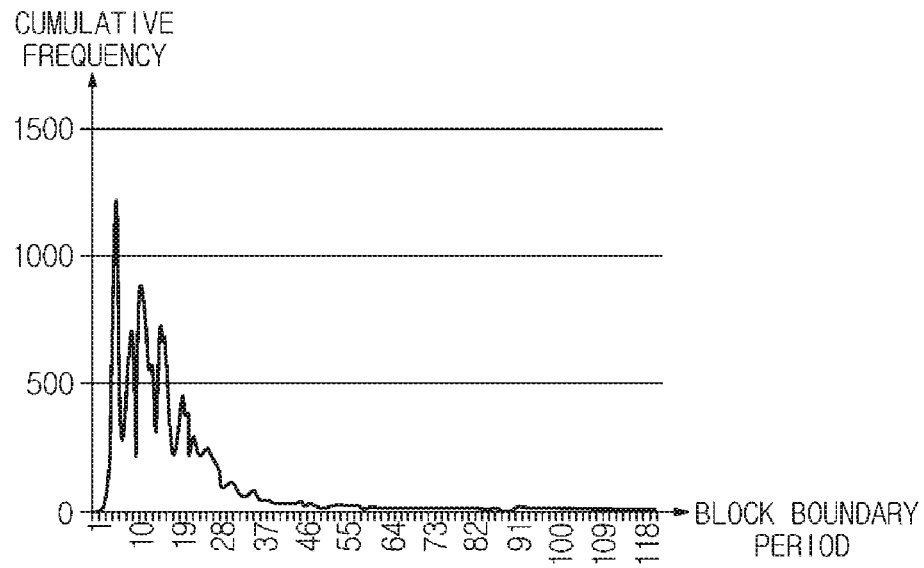
(A)
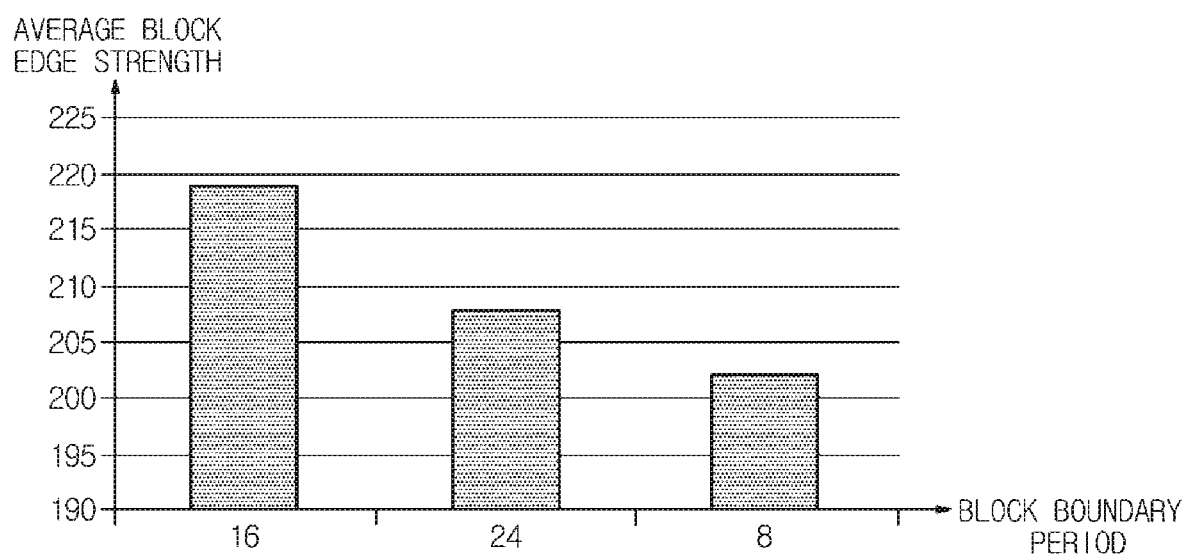
(B)

FIG. 14
(A)
(B)
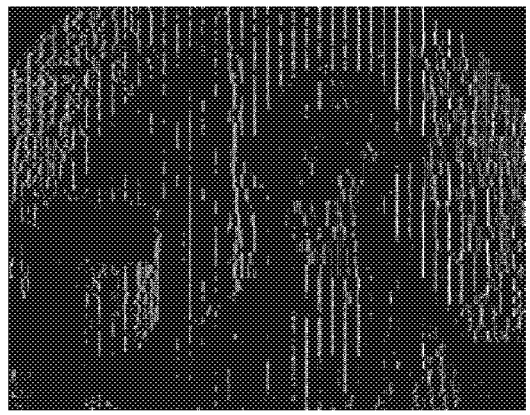
(C)
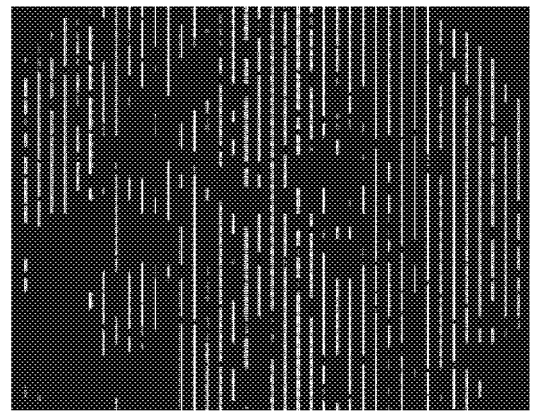
(D)

FIG. 16
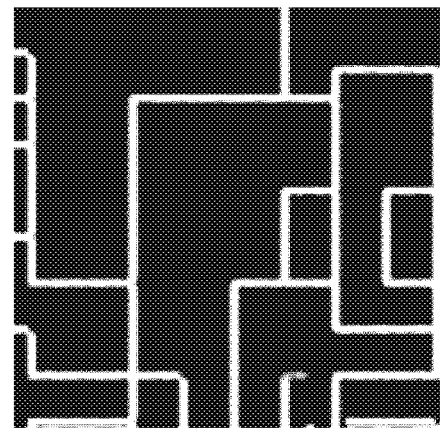
(C)
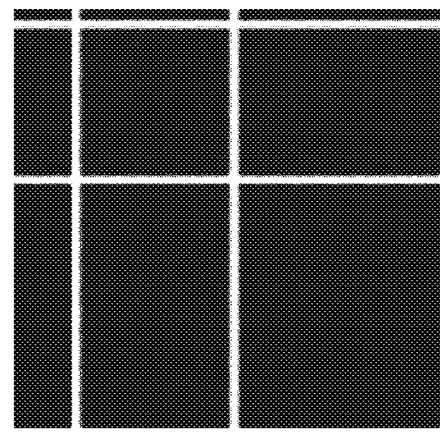
(B)
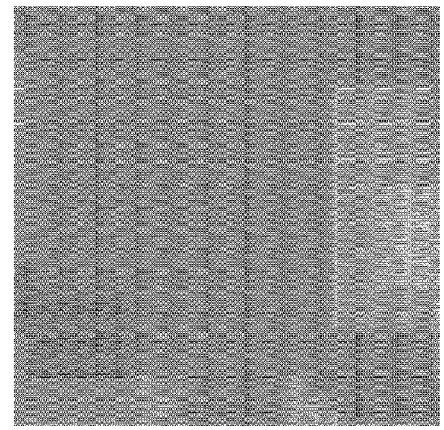
(A)

DISPLAY APPARATUS AND METHOD OF CONTROLLING THE SAME

CROSS-REFERENCE TO RELATED APPLICATIONS

This application is a National Stage of International Application No. PCT/KR2018/015540, filed Dec. 7, 2018, claiming priority based on Korean Patent Application No. 10-2017-0168084, filed Dec. 8, 2017, the contents of all of which are incorporated herein by reference in their entirety.

TECHNICAL FIELD

The present disclosure relates to a display apparatus capable of removing block noise occurring in a compressed image and a method of controlling the same.

BACKGROUND ART

A display apparatus is an output device that converts acquired or stored electrical information into visual information and displays the visual information to a user. In addition, the display apparatus may perform predetermined image processing on a received or stored image, and display the processed image to a user.

With recent improvement in the performance of cameras, moving images come to have a higher resolution. However, when a produced image is compressed and transmitted, block noise may occur in the process of image processing due to the limited transmission bandwidth.

With development of technology for compressing moving images, the block noise also comes in different shapes. For example, compression codecs prior to MPEG-4 generate block noise in regular shapes and sizes. However, recent H-264 or H-265 coding schemes generate block noises in irregular and various shapes.

In the H-264 or H-265 coding scheme, block noise boundaries may be blurred by deblocking filtering. In addition, even when an image encoded with H-264 or H-265 is upscaled at an outside of the display apparatus, block noise boundaries may be blurred. Accordingly, there is a need for a method of detecting blurred block noise boundaries.

The conventional technologies for removing the above described constraints have the following technical features and limitations.

Related art 1 (U.S. Registered Patent No.: U.S. Pat. No. 7,865,035) discloses a technique of receiving video parameter information from a decoder, analyzing image quality, and adjusting the filter strength on the basis of information about the image quality. However, since related art 1 receives information for analyzing the image quality from the decoder, and thus has difficulty in coping with an input of a blind image, information of which is unclear.

Related art 2 (U.S. Registered Patent No.: U.S. Pat. No. 7,911,538) discloses a technique of calculating the strength of block noise using edge ratio, edge value, and edge count, and performing deblocking filtering on the basis of the calculated strength. However, Related art 2 has a low accuracy due to a large amount of general edge information.

(Patent Document 1) U.S. Pat. No. 7,865,035 B2
(Patent Document 2) U.S. Pat. No. 7,911,538 B2

DISCLOSURE

Technical Problem

The present disclosure provides a display apparatus that is improved to reduce block noise by performing a plurality of block noise boundary detections and generating a block noise boundary map on the basis of a result of the detections to cope with local random block noise having irregular shaped and blurred block boundaries so that adaptive deblocking filtering is performed, and a method of controlling the same.

Technical Solution

According to an aspect of the present disclosure, there is provided a display apparatus including: an image receiver configured to receive an image; a block boundary map generator configured to generate a block boundary map by performing convolution using a plurality of kernels on the image received from the image receiver; a filter parameter determiner configured to determine a filter parameter on the basis of the block boundary map and a block boundary period included in the block boundary map; a deblocking filter configured to vary a filter strength on the basis of the determined filter parameter; and a display on which an image in which block noise is removed by the deblocking filter is displayed.

The block boundary map generator may generate a first block boundary map by comparing correlation values obtained by performing the convolution using the plurality of kernels with a predetermined reference value, and generate a second block boundary map by correcting the first block boundary map on the basis of continuity of a block boundary included in the first block boundary map.

The block boundary map generator may calculate a histogram obtained by accumulating a number of block boundaries included in the second block boundary map, calculate an average block edge strength on the basis of the histogram, and determine the block boundary period on the basis of the average block edge strength and a predetermined reference value.

The block boundary map generator may generate a third block boundary map by correcting the second block boundary map on the basis of the determined block boundary period.

The filter parameter determiner may determine the filter parameter on the basis of at least one of the average block edge strength, the block boundary period, a reliability of the block boundary period, or a block edge strength included in the third block boundary map.

The deblocking filter may adjust the filter strength to be proportional to the block boundary period or the magnitude of the average block edge strength.

The block boundary map generator may perform normalization on the image received from the image receiver.

The block boundary map generator may generate a plurality of correlation maps on the basis of the correlation values, and generate the first block boundary map on the basis of locations of selected pixels in the plurality of correlation maps.

The first block boundary map may include a two-directional map generated in a horizontal direction and a vertical direction.

The block boundary map generator may determine the block boundary period on the basis of an offset when the input image includes a letter box.

According to another aspect of the present disclosure, there is provided a method of controlling a display apparatus, the method including: receiving an image; generating a block boundary map by performing convolution using a plurality of kernels on the image; determining a filter parameter on the basis of the block boundary map and a block boundary period included in the block boundary map; performing deblocking filtering by varying a filter strength on the basis of the determined filter parameter; and displaying a result of the filtering.

The generating of the block boundary map may include: generating the block boundary map by comparing correlation values obtained by performing convolution using the plurality of kernels with a predetermined reference value, and correcting the block boundary map on the basis of continuity of a block boundary included in the block boundary map.

The correcting of the block boundary map may include: calculating a histogram obtained by accumulating a number of block boundaries included in the generated block boundary map; and determining the block boundary period on the basis of the average block edge strength and a predetermined reference value.

The correcting of the block boundary map includes correcting the corrected block boundary map on the basis of the determined block boundary period.

The determining of the filter parameter may include determining the filter parameter on the basis of at least one of the block boundary period, a reliability of the block boundary period, or a block edge strength included in the third block boundary map.

The performing of deblocking may include adjusting the filter strength to be proportional to the block boundary period or the magnitude of the average block edge strength.

The generating of the block boundary map may include performing normalization on the image.

The generating of the block boundary map may include generating a plurality of correlation maps on the basis of the correlation values, and generating the block boundary map on the basis of a location of a selected pixel in the plurality of correlation maps.

The generating of the block boundary map may include determining the block boundary period on the basis of an offset when the input image includes a letter box.

Advantageous Effects

According to the above-described aspects of the present disclosure, the display apparatus and the method of controlling the same can more effectively reduce block noise compared to the conventional technology by performing a plurality of block noise boundary detections and generating a block noise boundary map on the basis of a result of the detections to cope with local random block noise having irregular block shapes and blurred block boundaries so that adaptive deblocking filtering is performed

DESCRIPTION OF DRAWINGS

FIGS. 5 to 11 are detailed views for describing the method shown in FIG. 4.

FIGS. 13A and 13B are views for describing a method of determining a block boundary period.

FIGS. 14A to 14D are views illustrating a process of detecting a block boundary according to an example.

FIGS. 16A to 16C are views for describing a block boundary detection effect according to an embodiment.

MODE FOR DISCLOSURE

Figure 1:
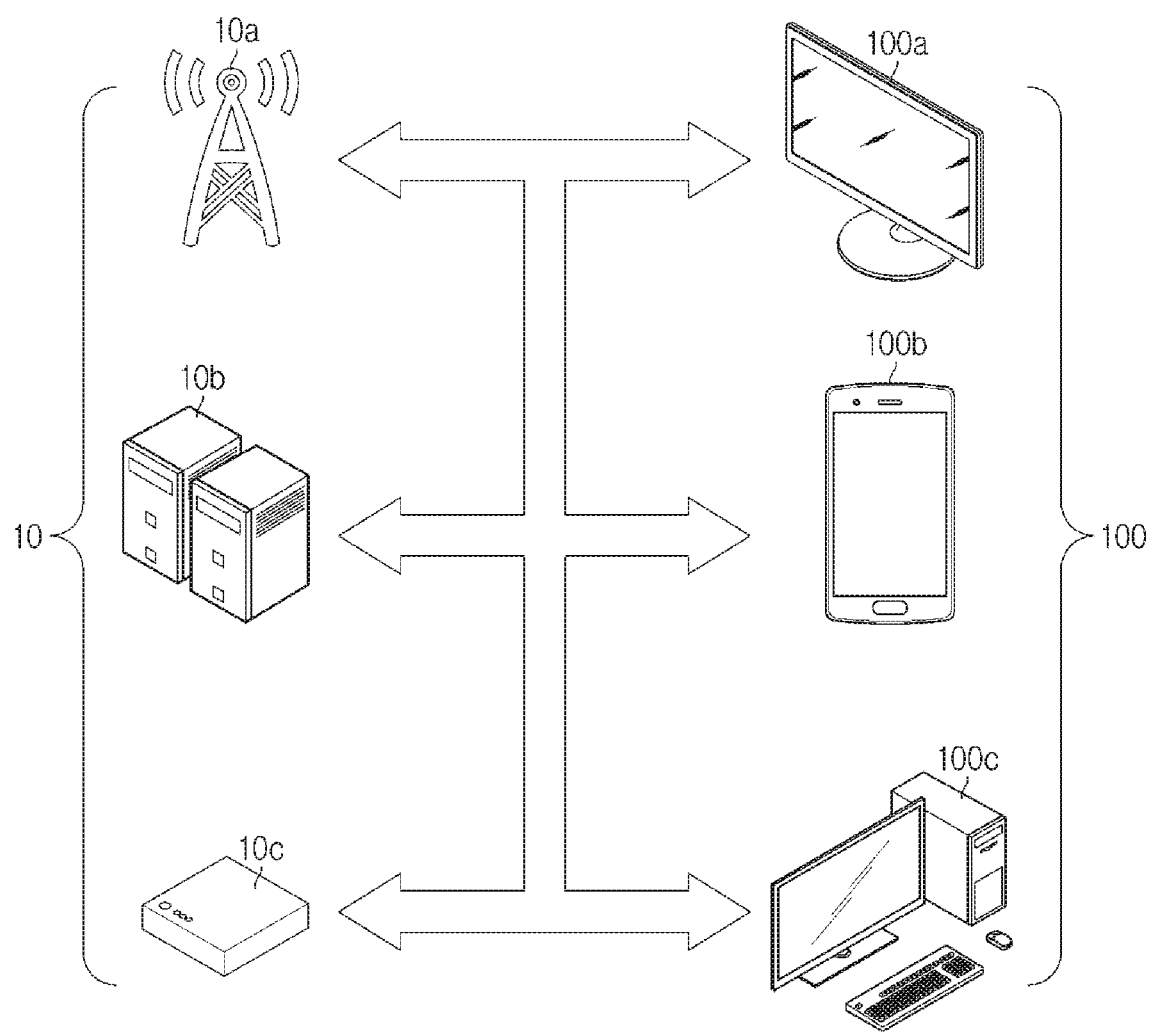
FIG. 1 is a diagram illustrating a configuration in which an image is transmitted to a display apparatus according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a diagram illustrating a configuration in which an image is transmitted to a display apparatus 100 according to an embodiment.

Referring to FIG. 1, the display apparatus 100 may receive a compressed or decompressed image from an image provider 10.

The display apparatus 100 refers to an output device capable of providing an image to a user. To this end, the display apparatus 100 may be provided with a processor, such as a central processing unit (CPU) or a micro control unit (MCU) that is required for processing an image and performing functions.

Referring to FIG. 1, the display apparatus 100 may include a television apparatus 100a, a portable terminal apparatus 100b, or a computer apparatus 100c, such as a personal computer or a server computer.

Meanwhile, the display apparatus 100 may display a still image or a moving image to a user using various types of display device. The display device may be variously implemented using a cathode ray tube, a cold cathode fluorescent lamp, a light emitting diode, an organic light emitting diode, an active-matrix organic light emitting diode, liquid crystals, electronic paper, or the like.

In addition, the display apparatus 100 may output sound to the user at the same time of reproducing an image.

The image provider 10 refers to a provider that transmits a stored or generated image and/or sound to the display apparatus 100 in the form of data. Referring to FIG. 1, the image provider 10 may include a broadcast transmission apparatus 10a, a server apparatus 10b, or an external storage medium 10c detachable from the television apparatus 100a.

The broadcast transmission apparatus 10a is provided to transmit image data and/or sound data to the display apparatus 100 using electromagnetic waves of a predetermined frequency band for public transmission.

The server apparatus 10b is provided to transmit image data and/or sound data to the display apparatus 100 through a wireless network or a wired network. Here, the wired communication network may be a network constructed using a cable, such as a pair cable, a coaxial cable, a fiber optic cable, an Ethernet cable, or the like. The wireless network may be a network implemented using short range communication standards or mobile communication standards. The wireless network using the short range communication standards may be implemented using wireless communication technology, such as Wi-Fi, Bluetooth, zigbee, Wi-Fi Direct (WFD), ultra wideband (UWB), infrared data association (IrDA), bluetooth low energy (BLE), near field communication, and the like. The wireless network using the mobile communication standards may be classified into 3GPP series wireless communication technology, such as evolutionary high speed packet access (HPDA+) or long term evolution (LTE), 3GPP2 series wireless communication technology, such as optimized evolution-data (EV-Do), or WiMAX series wireless communication technology, such as WiBro Evolution.

The external storage medium 10c may store various types of data and may transmit image to the display apparatus 100 by being directly coupled to the display apparatus 100 or may transmit or provide image data to the display apparatus 100 using a cable or a wireless network, as in an external hard disk or a universal serial bus (USB) memory device.

The image provider 10 according to the embodiment compresses a produced image before providing the image to the display apparatus 100. The display apparatus 100 receiving the compressed image decodes the compressed image and outputs the decoded image.

However, the compressed image transmitted by the image provider 10 may have an irregular block shape, and block noise in which block boundaries are blurred by in-loop deblocking filtering.

As another example, when a set-top box rescales a low-resolution image and provides the image to the television apparatus 100a, the provided image may have blurring block noise, including block noise with irregular block sizes and blurred block boundaries.

The display apparatus 100 and the method of controlling the same may provide an improved image to a user by detecting and removing block noise that are generated in irregular forms.

Figure 2:
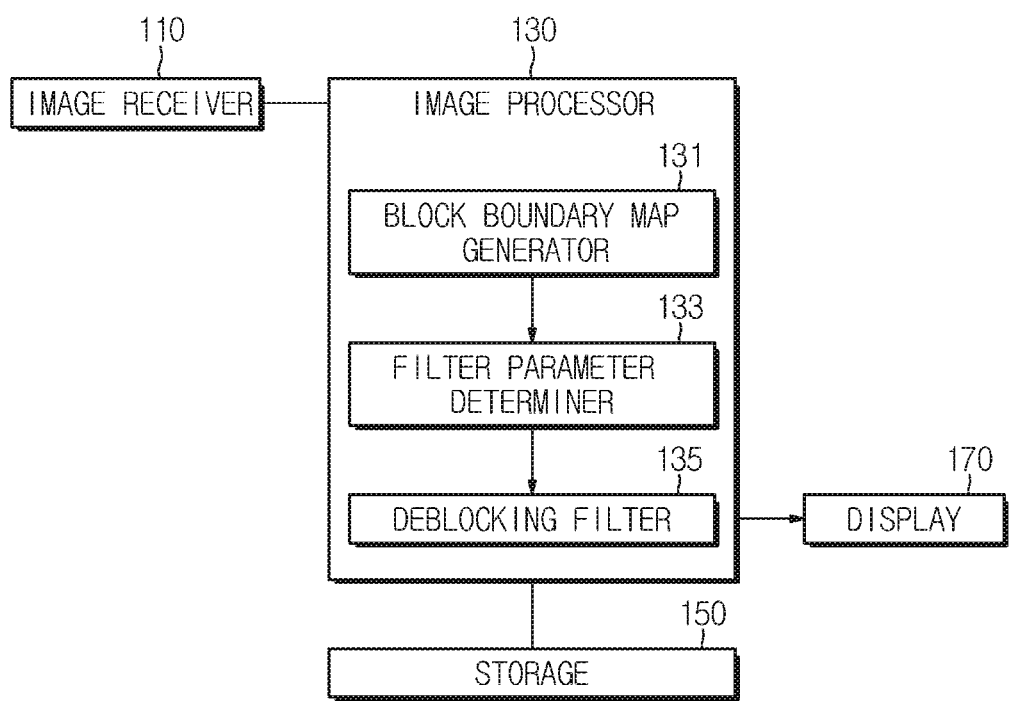
FIG. 2 is a control block diagram illustrating a display apparatus according to an embodiment.

FIG. 2 is a control block diagram illustrating a display apparatus according to an embodiment.

Referring to FIG. 2, the display apparatus 100 includes an image receiver 110 for receiving an image transmitted by the image provider 10 and decompressing the received image, an image processor 130 for detecting block boundaries in the received image and performing deblocking filtering, a storage 150 for storing the provided image and various types of data, and a display 170 for outputting the image in which block noise is removed.

In detail, the image receiver 110 may receive an image that is decompressed by the image processor 10 from the outside of the display apparatus 100. Alternatively, the image receiver 110 may decompress an image, which has been received without being decompressed, using a decoder.

For example, the image receiver 110 decodes an image that is compressed by the H-264 or H-265 codec. However, the image receiver 110 according to the present disclosure is not limited thereto, and may be implemented as various decoding modules as long as it can decompress an image and generate irregular block boundaries and blurred blocks.

The image processor 130 is configured to remove irregular block noise. The image processor 130 may include a block boundary map generator 131 for generating a block boundary map on the basis of a block boundary existing in a received image, a filter parameter determiner 133 for determining a parameter with which adaptive deblocking filtering is performed, and a deblocking filter 135 for performing deblocking on the basis of the determined parameter. First, the block boundary map generator 131 performs convolution using a plurality of kernels corresponding to irregular and various forms of blocks, and generates an initial block boundary map (hereinafter, referred to as a first block boundary map) on the basis of a result value of the convolution (hereinafter, referred to as a correlation value).

In addition, the block boundary map generator 131 uses a histogram to determine an interval between block boundaries (hereinafter, referred to as a block boundary period). In other words, the block boundary map generator 131 determines the block boundary period by comparing a block edge strength calculated on the basis of the histogram with a predetermined threshold value.

The block boundary map generator 131 may generate a final block boundary map by correcting the first block boundary map on the basis of the determined block boundary period.

The filter parameter determiner 133 may determine a filter parameter that is applied to deblocking, on the basis of at least one of a final block boundary map and an average block edge strength calculated during generation of the final block boundary map, a reliability calculated from the histogram, a block edge strength, or a block boundary period.

In detail, the filter parameters may be classified into a global filter parameter in a frame and a local filter parameter applied to a block of each image. The global parameter may be determined on the basis of at least one of an average block edge strength and a reliability calculated in a histogram. In addition, the local parameter may be determined on the basis of at least one of a reliability calculated from a histogram, a block edge strength, or a block boundary period.

Factors required for determining the filter parameters may be described below in detail with reference to other drawings.

The deblocking filter 135 performs adaptive deblocking filtering on the basis of the parameter transmitted from the filter parameter determiner 133.

The adaptive deblocking filtering performed by the deblocking filter 135 adjusts the filter strength by further considering the average block edge strength, the block boundary period, the reliability, and the block edge strength as described above, which are not used in the conventional deblocking filtering.

For example, the deblocking filter 135 assigns a higher reliability to a block boundary period having a higher frequency in the histogram described above, evaluates that a block boundary period having a lower frequency has a lower reliability, and adjusts the strength of the block boundary filtering according to the reliability.

As another example, the deblocking filter 135 may adjust the filter strength according to the local block edge strength of the current pixel. In detail, the filter strength may be adjusted to increase as the block edge strength is greater, and decrease as the block edge strength is weaker.

As another example, when the block boundary period has a large value, the deblocking filter 135 may adjust the filter size in proportion to the block boundary size to remove blur at block boundaries while preventing an afterimage.

The deblocking filter 135 may adjust the global filter strength of the entire frame by calculate global statistics of the filtering.

The deblocking filter 135 may include at least one of a weighted average filter, a bilateral filter, or a polyphase filter because the deblocking filter 135 varies the applied parameters unlike in general filters.

Meanwhile, the image processor 130 may include various other components for processing an image and modules for performing functions. The image processor 130 may include a memory (not shown) for storing data regarding an algorithm for controlling the components of the display apparatus 100 or a program that represents the algorithm, and a processor (not shown) for performing the above described operations using the data stored in the memory. At this time, the memory and the processor may be implemented as separate chips.

The storage 150 may store the decompressed image and may store various types of data, such as the determined parameters and algorithms required for performing functions.

The storage 150 may be implemented as at least one of a nonvolatile memory device, such as a read only memory (ROM), a programmable ROM (PROM), an erasable programmable ROM (EPROM), an electrically erasable programmable ROM (EEPROM), and a flash memory; a volatile memory device, such as a random access memory (RAM); or other storage media, such as a hard disk drive (HDD), a CD-ROM, and the like. However, the storage 135 according to the present disclosure is not limited thereto. The storage 135 may be implemented a memory implemented as a chip separated from a processor described above with regard to the image processor 130, or may be implemented as a single chip integrated with the processor.

The display 170 outputs an image filtered by the image processor 130 to the user.

In detail, the display 170 for visually displaying an image may include a display panel (not shown) and a display driver (not shown) for driving the display panel.

The display panel outputs an image according to image data received from the display driver. The display panel may include a pixel serving as a unit for displaying an image. Each pixel may receive an electrical signal representing image data and output an optical signal corresponding to the received electrical signal. The optical signals output by a plurality of the pixels included in the display panel 143 are combined such that a single image is displayed on the display panel 143.

In addition, the display panel 143 may be divided into various types according to a method of outputting an optical signal in each pixel. For example, the display panel may be divided into a light emissive display that emits light by itself, a transmissive display that blocks or transmits light emitted from a backlight and the like, and a reflective display that reflects or absorbs light incident from an external light source.

The display panel may be implemented using a cathode ray tube (CRT) display, a liquid crystal display (LCD) panel, a light emitting diode (LED) panel, an organic light emitting diode (OLED), a plasma display panel (PDP), a field emission display (FED) panel, and the like. However, the display panel according to the present disclosure is not limited thereto, and may be implemented using various display devices capable of visually displaying an image corresponding to image data.

The display driver receives image data from the image processor 130 and drives the display panel to display an image corresponding to the received image data. In detail, the display driver transmits an electrical signal corresponding to image data to each of the plurality of pixels constituting the display panel.

The display driver may transmit an electrical signal to each pixel in various ways such that electrical signals are transmitted to all the pixels constituting the display panel within a short time. For example, according to the interlaced scanning method, electric signals may be alternately transmitted to pixels included in odd-numbered rows and pixels included in even-numbered rows among all the pixels constituting the display panel. In addition, according to the orthographic scanning method, the display driver may sequentially transmit electrical signals to a plurality of pixels in units of rows.

As such, when the display driver transmits an electrical signal corresponding to image data to each pixel constituting the display panel, each pixel outputs an optical signal corresponding to the received electrical signal, and the optical signals output by the respective pixels are combined such that a single image is displayed on the display panel.

Meanwhile, the display apparatus 100 may include various components, such as a sound output (not shown) for outputting sound data, in addition to the above-described components.

Hereinafter, a method of controlling a display apparatus for reducing block noise will be described in detail with reference to the drawings.

Figure 3:
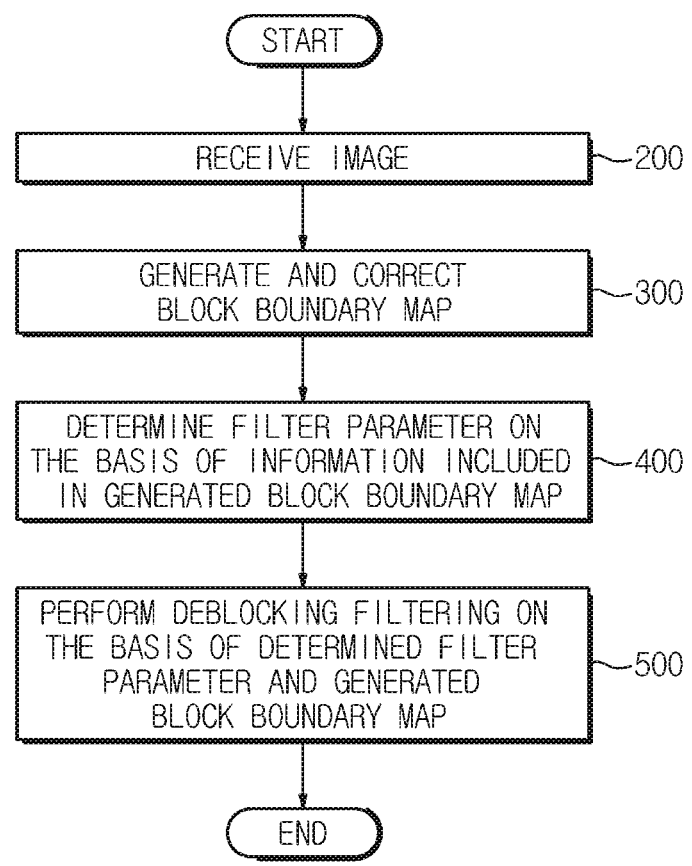
FIG. 3 is a flowchart showing a method of controlling a display apparatus according to an embodiment.

FIG. 3 is a flowchart showing a method of controlling a display apparatus according to an embodiment.

Referring to FIG. 3, the method of controlling the display apparatus includes receiving an image, which is compressed and transmitted by the image producer 10, or an image, which is transmitted without being compressed (200).

According to an example, the image, which is decompressed by the image receiver 110 or is decompressed and transmitted by the image producer 10, has irregular shaped blocks as described above.

The display apparatus 100 generates and corrects a block boundary map for the image, which is decompressed by the image receiver 110 or is received in a decompressed state by the image receiver 110 (300).

In detail, the display apparatus 100 generates a first block boundary map. The first block boundary map is generated by normalization, convolution using a plurality of kernels, and using a result of the convolution.

Then, the display apparatus 100 maintains boundary detected in the first block boundary map that are continuous for a predetermined number of pixels or more in the vertical and horizontal directions, and excludes the remaining boundaries from the block boundary. Then, the display apparatus 100 determines a block period on the basis of a histogram that is generated in a cumulative manner by integrating counts of a plurality of inter-block intervals, and then corrects the first block boundary map on the basis of the determined block period.

As such, the display apparatus 100 generates the first block boundary map and modifies the first block boundary map so that a final block boundary map is generated.

The display apparatus 100 determines a filter parameter on the basis of information included in the finally generated block boundary map (400).

For example, the filter parameters may be divided into a global parameter that is based on at least one of an average block edge strength included in the generated final block boundary map or a reliability determined from the histogram and a local parameter that is based on at least one of a reliability, a block boundary period, an average block edge strength, a block boundary size, or a block edge strength.

The display apparatus 100 performs deblocking filtering on the basis of the determined filter parameter and the final block boundary map (500).

The adaptive deblocking filtering according to the disclosed example may adjust the strength of the filtering on the basis of the determined global and local parameters.

Figure 4:
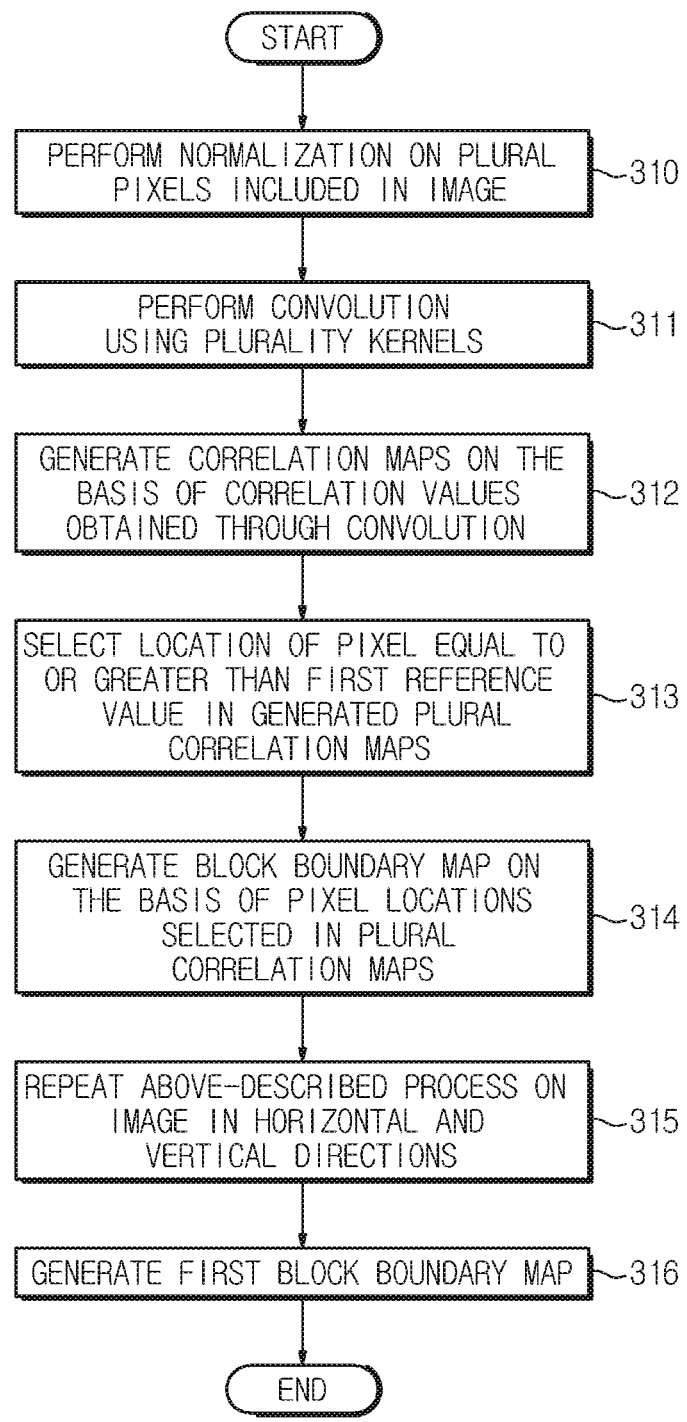
FIG. 4 is a flowchart showing a method of generating a first block boundary map described in FIG. 3.

FIG. 4 is a flowchart showing a method of generating a first block boundary map described in FIG. 3. The method of generating a first block boundary map will be described with reference to FIG. 4 in conjunction with FIGS. 5 to 11, which are detailed views for describing the method shown in FIG. 4, in order to avoid redundancy.

Referring to FIG. 4, the display apparatus 100 performs normalization on a plurality of pixels included in the input image (310).

Normalization may be performed through an average value of pixels according to the number of kernel taps to be used later for an input image. The display apparatus 100 performs normalization by calculating differential pixels through a difference between each pixel and the average value and dividing respective pixels by vector magnitudes determined by the calculated differential pixels.

Figure 5:
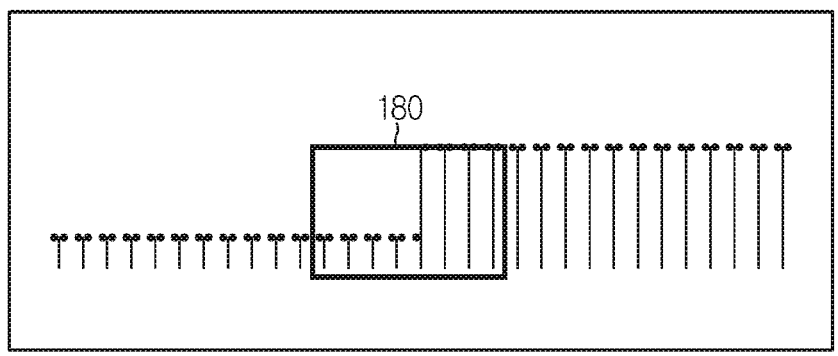

Referring to FIG. 5, when the block boundary map generation process according to the example uses a kernel having eight taps, the normalization process may be performed by obtaining the average of seven neighboring pixels and a pixel 180 corresponding to a block boundary, and using a vector magnitude calculated from the difference between each pixel and the average.

Meanwhile, the vector magnitude calculated in the normalization process may correspond to the block edge size of the boundary pixel 180, and may be used to determine a block boundary period and a filter parameter.

After the normalization process, the display apparatus 100 performs convolution using a plurality of kernels (311).

The display apparatus 100 according to the embodiment performs convolution using one or more kernels to detect irregular block boundaries of various sizes and shapes that may be generated due to compression.

Figure 6A:
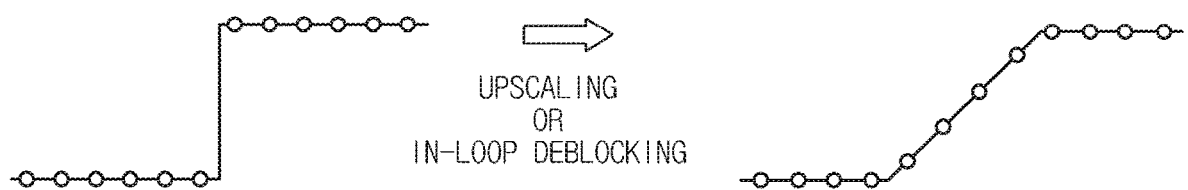

Referring to FIGS. 6A and 6B, a block boundary generated in a compressed image may be blurred by the upscaling or in-loop deblocking.

The display apparatus 100 may detect block boundaries by performing convolution using a plurality of kernels (Kernel 1, Kernel 2, and Kernel 3) as shown in FIG. 6B.

The display apparatus 100 generates a plurality of correlation maps on the basis of correlation values obtained through the convolution (312).

Referring to FIG. 7, the display apparatus 100 performs convolution on a normalized image 140 by using a first kernel (Kernel 1, 181) in a horizontal direction 160. The display apparatus 100 generates a first correlation map using a correlation value obtained using the first kernel 181.

In addition, the display apparatus 100 performs convolutions in the same direction 160 using a second kernel (kernel 2, 182) and a third kernel (kernel 3, 183). The display apparatus 100 generates a second correlation map using a correlation value obtained using the second kernel 182 and generates a third correlation map using a correlation value obtained using the third kernel 183.

Meanwhile, the shapes and number of the kernels are not limited to those shown in FIG. 6B or FIG. 7, and may be provided in a variety.

The display apparatus 100 selects a location of a pixel that is equal to or greater than a predetermined first reference value in the generated plurality of correlation maps (313).

Referring to FIG. 8, the first relevance map 160 may be generated as a result of convolution using the first kernel 181 in the image 140 that is subjected to a normalization process. In detail, the first correlation map 160 may have correlation values according to pixel locations matching with a block boundary area.

Figure 9:
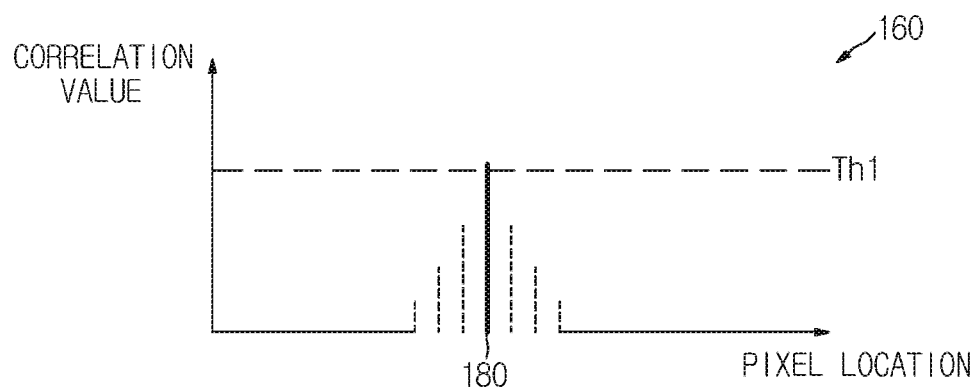

Referring to FIG. 9, the display apparatus 100 selects a correlation value that is equal to or greater than a predetermined first reference value Th1 in the generated correlation map 160. According to an example, a pixel having a correlation value equal to or greater than the first reference value Th 1 in the first correlation map 160 may be a pixel 180 forming a block boundary.

The display apparatus 100 generates a block boundary map on the basis of the pixel locations selected in the plurality of correlation maps (314).

Figure 10:
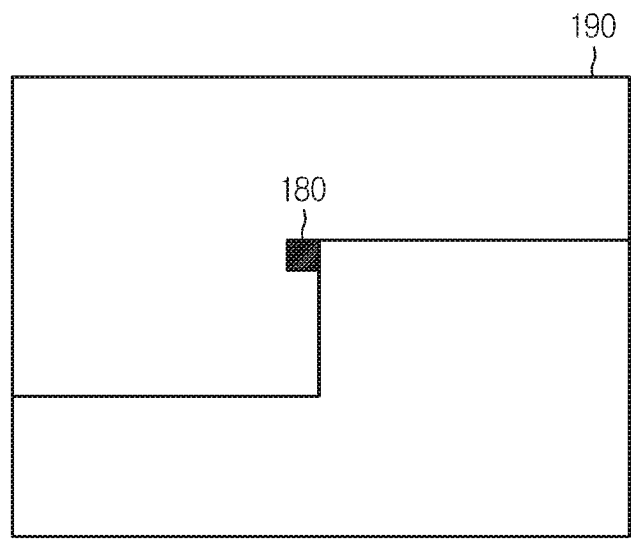
Figure 11:
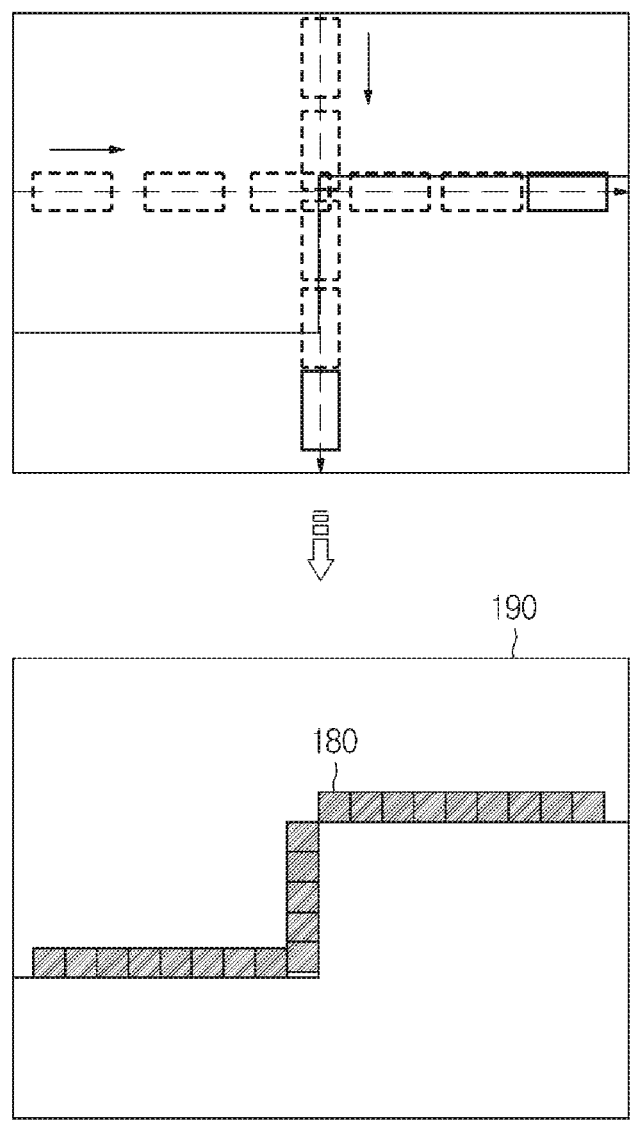

Referring to FIG. 10, the display apparatus 100 generates a block boundary map 190 including the pixel 180 selected through FIGS. 8 and 9.

Then, the display apparatus 100 repeats the above-described processes in different horizontal and vertical directions (315), to generate the first block boundary map 190 (316).

Accordingly, the first block boundary map 190 may be a two-directional map of the horizontal direction and the vertical direction.

Figure 12:
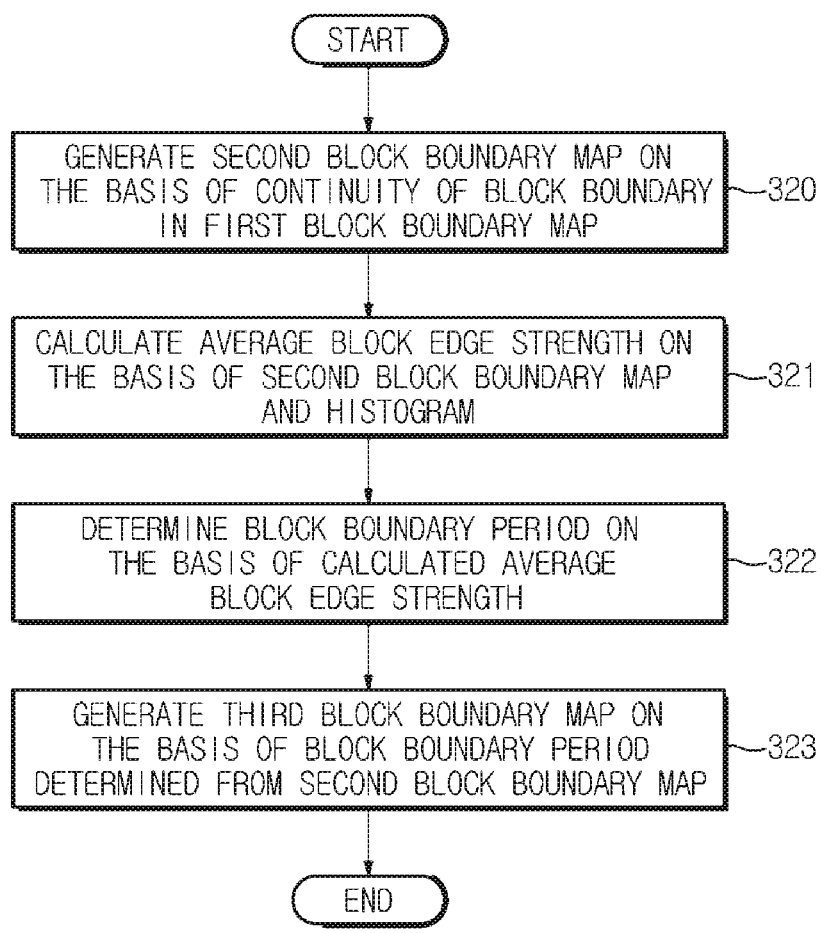
FIG. 12 is a flowchart showing a method of correcting a generated block boundary map.

FIG. 12 is a flowchart showing a method of correcting a generated block boundary map. FIGS. 13A and 13B are views for describing a method of determining a block boundary period. In order to avoid redundancy, the following description will be made with reference to FIGS. 12 and 13.

Referring to FIG. 12, the display apparatus 100 generates a second block boundary map on the basis of the continuity of a block boundary in the first block boundary map (320).

The block boundary is distinguished from a texture component in the image and has a continuity corresponding to a block size. Accordingly, the display apparatus 100 may identify a block boundary on the basis of whether a boundary detected in the first block boundary map 190 corresponds to a predetermined number of consecutive pixels. The predetermined number of pixels may vary, for example, according to the input image.

Meanwhile, when the continuity does not exist, the display apparatus 100 determines the detected boundary to be a texture component.

The display apparatus 100 generates a second block boundary map by excluding a block boundary having consecutive pixels in a number less than the predetermined number from the block boundary of the first block boundary map 190.

Then, the display apparatus 100 calculates an average block edge strength on the basis of the second block boundary map and the histogram (321).

In detail, the display apparatus 100 accumulates a frequency in the histogram whenever a block boundary exists at a predetermined pixel interval in the second block boundary map.

For example, when a block boundary exists at each interval of five pixels in the second block boundary map, the display apparatus 100 accumulates a frequency for a fifth bin of the histogram. After generating the histogram, the display apparatus 100 calculates the average block edge average according to the pixel interval (a block boundary period of five pixels). In detail, the average block edge strength is calculated by dividing the sum of the vector magnitudes calculated at the time of generating the first block boundary map by a period-specific frequency.

The display apparatus 100 determines a block boundary period on the basis of the calculated average block edge strength (322).

In detail, the display apparatus 100 compares the average calculated block edge strength with a predetermined reference value (a second reference value). That is, the display apparatus 100 determines a period in which the average block edge strength is equal to or greater than the second reference value to be a block boundary period.

FIG. 13A is a histogram showing a cumulative frequency with respect to a block boundary period according to an example.

FIG. 13B is a graph showing the top three block boundary periods among block boundary periods in which the average block edge strength value calculated in each period is equal to or greater than the second reference value (for example, 110). The top three block boundary periods determined in the graph of FIG. 13B are 16, 24, and 8.

According to another embodiment, the display apparatus 100 may determine a block boundary period on the basis of an offset when a letterbox exists in the input image. That is, the display apparatus 100 may determine the block boundary period by generating the above described histogram while omitting an initial block boundary of the image using a predetermined offset and then by calculating the average block edge strength on the basis of the histogram.

Referring again to FIG. 12, the display apparatus 100 corrects the second block boundary map on the basis of the determined block boundary period so that a third block boundary map is generated (323).

In detail, the display apparatus 100 maintains only a block boundary corresponding to the determined block boundary period while excluding the remaining block boundaries, so that a final block boundary map (a third block boundary map) is generated.

FIGS. 14A to 14D are views illustrating a process of detecting a block boundary according to an example, in particular, illustrating a block boundary detection process in the vertical direction.

Referring to FIG. 14A, an input image, after decompression, includes a plurality of blocks. According to the disclosed embodiment, the display apparatus 100 performs convolution using a plurality of kernels, and then generates correlation maps on the basis of correlation values. That is, FIG. 14B shows an example of one of a plurality of correlation maps generated through the above-described control method.

The display apparatus 100 generates a first block boundary map by selecting pixel locations of pixels that are equal to or greater than a first reference value with respect to a vertical direction in a frame of the correlation map as shown in FIG. 14B. That is, FIG. 14C is an example of the first block boundary map.

The display apparatus 100 calculates an average block edge strength on the basis of a histogram, and determines a block period on the basis of the average block edge strength. The display apparatus 100 may correct the first block boundary map through the determined block period to finally generate a third block boundary map as shown in FIG. 14D.

Figure 15:
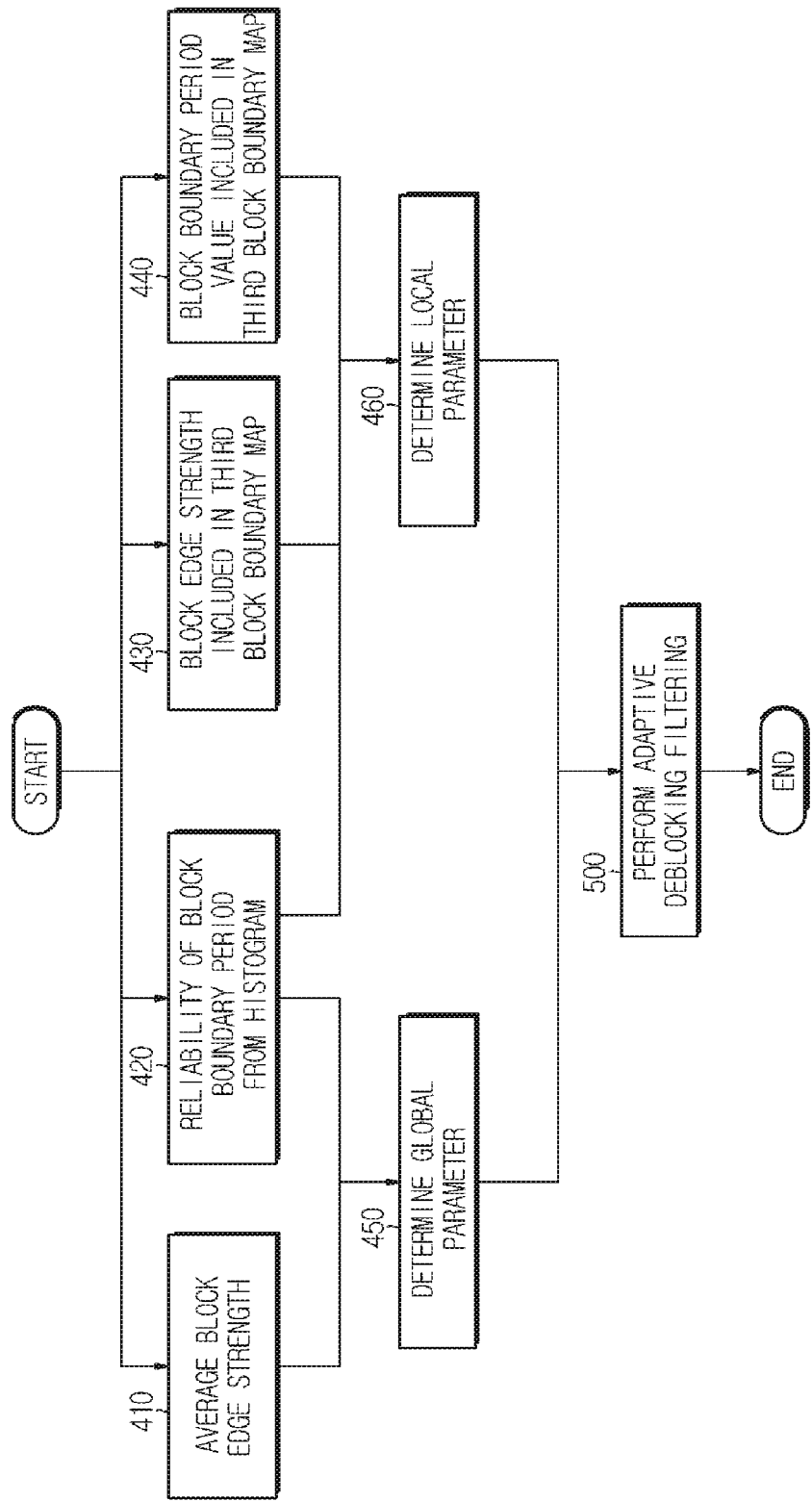
FIG. 15 is a detailed flowchart for describing a control method of determining a filter parameter and performing deblocking filtering according to an embodiment.

FIG. 15 is a detailed flowchart for describing a control method of determining a filter parameter and performing deblocking filtering according to an embodiment.

Referring to FIG. 15, the display apparatus 100 calculate the average block edge strength, and evaluates the reliability of the block boundary period from the histogram derived during generation of the third block boundary map (410 and 420).

In detail, the display apparatus 100 may assign a higher reliability to a block boundary period having a higher frequency and a lower reliability to a block boundary period having a lower frequency.

The calculated average block edge strength and reliability may be determined to be a global parameter (450). In addition, the evaluated reliability may be determined to be a local parameter (460).

A block edge strength 430 and a block boundary period 440 included in the third block boundary map may be determine to be the local parameter (460).

The display apparatus 100 performs adaptive deblocking filtering on the basis of the determined parameters and the generated third block boundary map (500).

In detail, the display apparatus 100 may adjust the filter strength according to the global parameter, which is determined by the global average block edge strength and the reliability of the block boundary period calculated from the histogram, and also adjust the filter strength according to the local parameter determined by at least one of the reliability, the local block edge strength, or the block boundary period value.

For example, the display apparatus 100 may assign a higher reliability to a block boundary period having a higher frequency in the histogram, evaluate that a block boundary period having a lower frequency has a lower reliability, and adjust the block boundary filtering strength according to the reliability.

As another example, the display apparatus 100 may adjust the filter strength according to the local block edge strength and the average block edge strength. In detail, the filter strength may be adjusted to increase as the local block edge strength is great, and decrease as the local block edge strength is weaker.

As another example, when the block boundary period has a large value, the display apparatus 100 may adjust the filter size in proportion to the block boundary size to remove blur at block boundaries while preventing an afterimage.

Meanwhile, the above described adjustment of the filter strength may be performed by individual parameters, but may be comprehensively performed using a plurality of parameters proportion to a predetermined coefficient.

FIGS. 16A to 16C are views for describing a block boundary detection effect according to an embodiment, and FIGS. 17A to 17C are views for comparing the block noise reduction according to the disclosure.

Referring to FIG. 16, an input image is received by the display apparatus 100. The input image decompressed by the image receiver 110 may include irregular blocks as shown in FIG. 16A.

When the conventional deblocking filtering is performed, only a regular block having a predetermined shape is detected. However, the display apparatus 100 may detect various shapes of blocks using a plurality of kernels.

FIG. 16B shows a block boundary detected in the conventional technique, and FIG. 16C shows a block boundary detected by the display apparatus 100 disclosed in the specification. That is, even when an input image including an irregular block is received, the display apparatus 100 may effectively detect the block boundaries.

Figure 17:
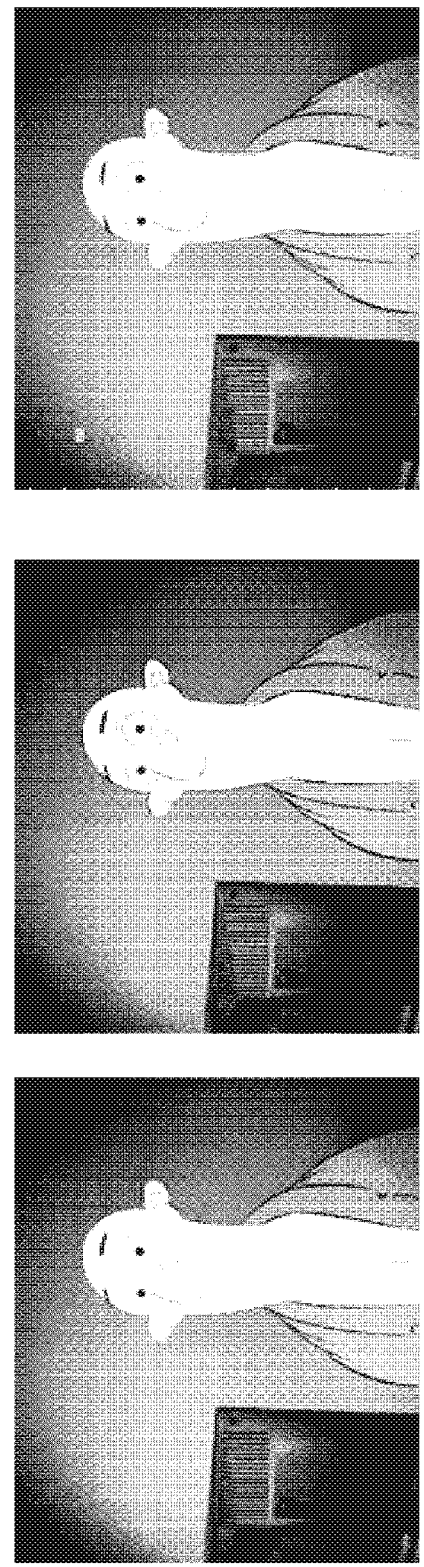
FIGS. 17A to 17C are views for comparing the block noise reduction according to the disclosure.

Referring to FIG. 17, the display apparatus 100 may receive an input image having blocks as shown in FIG. 17A.

Comparing FIG. 17B with FIG. 17C shows that the display apparatus 100 may detect block boundaries more accurately than the conventional techniques and thus may perform deblocking filtering in various adaptive manners, so that the block noise reduction effect may be enhanced.

That is, FIG. 17B shows a result of filtering performed by the conventional technique, and FIG. 17C shows a result of filtering performed by the display apparatus 100.

As such, the display apparatus and the method of controlling the same according to an aspect of the disclosure perform a plurality of block noise boundary detections and generate a block noise boundary map on the basis of a result of the detections to cope with local block noise having irregular shapes and blurred block boundaries, so that adaptive deblocking filtering is performed, and block noise is reduced more efficiently than the conventional technology.

The invention claimed is:

1. A display apparatus comprising:
   a display;
   a memory configured to store instructions; and
   a processor configured to execute the instructions to:
   provide a block boundary map including a first block boundary map corresponding to an image received from an image provider by performing convolution using a plurality of kernels on the image received from the image provider and a second block boundary map by correcting the first block boundary map based on continuity of a block boundary included in the first block boundary map;
   obtain a histogram by accumulating a number of block boundaries included in the second block boundary map;
   obtain an average block edge strength based on the histogram;
   identify a block boundary period based on the average block edge strength;
   identify a filter parameter based on the block boundary map corresponding to the image and the block boundary period corresponding to block boundaries included in the block boundary map corresponding to the image, the block boundary period indicating an interval between the block boundaries included in the block boundary map corresponding to the image;
   perform deblocking filtering on the image by varying a filter strength based on the identified filter parameter; and
   control the display to display the image in which block noise is removed by the deblocking filtering.

2. The display apparatus of claim 1, wherein the processor is configured to provide a third block boundary map by correcting the second block boundary map based on the identified block boundary period.

3. The display apparatus of claim 2, wherein the processor is configured to identify the filter parameter based on at least one of the average block edge strength, the block boundary period, a reliability of the block boundary period, or a block edge strength included in the third block boundary map.

4. The display apparatus of claim 3, wherein the processor is configured to adjust the filter strength to be proportional to the block boundary period or a magnitude of the average block edge strength.

5. The display apparatus of claim 1, wherein the processor is configured to perform normalization on the image received from the image provider.

6. The display apparatus of claim 1, wherein the processor is configured to provide a plurality of correlation maps based on the correlation values, and provide the first block boundary map based on locations of selected pixels in the plurality of correlation maps.

7. The display apparatus of claim 6, wherein the first block boundary map includes a two-directional map provided in a horizontal direction and a vertical direction.

8. The display apparatus of claim 1, wherein the processor is configured to identify the block boundary period based on an offset when the received image includes a letter box.

9. A method of controlling a display apparatus, the method comprising:
   receiving an image;
   providing a block boundary map including a first block boundary map corresponding to the image by performing convolution using a plurality of kernels on the image and a second block boundary map by correcting the first block boundary map based on continuity of a block boundary included in the first block boundary map;
   obtaining a histogram by accumulating a number of block boundaries included in the second block boundary map;
   obtaining an average block edge strength based on the histogram;
   identifying a block boundary period based on the average block edge strength;
   identifying a filter parameter based on the block boundary map corresponding to the image and the block boundary period corresponding to block boundaries included in the block boundary map corresponding to the image, the block boundary period indicating an interval between the block boundaries included in the block boundary map corresponding to the image;
   performing deblocking filtering on the image by varying a filter strength based on the identified filter parameter; and
   displaying a result of the filtering.

10. The method of claim 9, wherein the identifying of the filter parameter includes identifying the filter parameter based on at least one of the block boundary period, a reliability of the block boundary period, or the block edge strength included in the block boundary map.

* * * * *